United States Patent
Zwart et al.

(10) Patent No.: US 8,989,171 B2
(45) Date of Patent: Mar. 24, 2015

(54) WIRELESS AUDIO TRANSMISSION SYSTEM AND METHOD

(75) Inventors: Willem Zwart, Assendelft (NL); Dignus-Jan Moelker, Voorhout (NL); Robert Niels Schutten, Assendelft (NL); Robertus Cornelis Wilhelmus Lansbergen, Amsterdam (NL); Maarten Coenen, Uden (NL); Johannes Cornelis Hendrikus van Leeuwen, Los Gatos, CA (US)

(73) Assignee: Microchip Technology, Inc., Chandler, AZ (US)

( * ) Notice: Subject to any disclaimer, the term of this patent is extended or adjusted under 35 U.S.C. 154(b) by 2412 days.

(21) Appl. No.: 11/578,206

(22) PCT Filed: Apr. 5, 2004

(86) PCT No.: PCT/NL2004/000225
§ 371 (c)(1),
(2), (4) Date: Apr. 4, 2008

(87) PCT Pub. No.: WO2005/099156
PCT Pub. Date: Oct. 20, 2005

(65) Prior Publication Data
US 2008/0212582 A1    Sep. 4, 2008

(51) Int. Cl.
*H04B 7/212*    (2006.01)
*H04L 1/16*    (2006.01)
*H04L 1/00*    (2006.01)
*H04W 28/04*    (2009.01)
*H04W 72/04*    (2009.01)

(52) U.S. Cl.
CPC ....... *H04L 1/1692* (2013.01); *H04L 2001/0093* (2013.01); *H04W 28/04* (2013.01); *H04W 72/0446* (2013.01)

USPC ........... 370/348; 370/345; 370/346; 370/347; 370/349; 370/350; 370/478; 370/479; 370/498; 370/499; 370/500; 370/501; 370/502; 370/503

(58) Field of Classification Search
None
See application file for complete search history.

(56) References Cited

U.S. PATENT DOCUMENTS 6,301,249 B1 * 10/2001 Mansfield et al. ............ 370/394
6,373,842 B1 *  4/2002 Coverdale et al. ............ 370/394
(Continued)

FOREIGN PATENT DOCUMENTS

EP    1133094 A2    9/2001

OTHER PUBLICATIONS

IEEE 802.15.1, 2002.*
(Continued)

*Primary Examiner* — Faruk Hamza
*Assistant Examiner* — Aixa A Guadalupe-Cruz
(74) *Attorney, Agent, or Firm* — Kevin L. Daffer; Daffer McDaniel LLP

(57) ABSTRACT

A system and method transmit a data stream from a source to a destination over a communication channel. A transmitter includes devices for processing inputs to assemble data packets for the data stream, and a multiplexer for assembling a data frame to be transmitted over the communication channel, in which each data frame has at least one fixed slot. The multiplexer sets at least one freely allocatable time slot in each data frame. Retransmission control devices connected to the multiplexer retransmit a specific data packet which is not properly received by the destination, using one of the freely allocatable slots.

26 Claims, 4 Drawing Sheets

(56) References Cited

U.S. PATENT DOCUMENTS

| | | | | |
|---|---|---|---|---|
| 6,650,630 | B1* | 11/2003 | Haartsen | 370/345 |
| 6,788,670 | B1* | 9/2004 | Larsson | 370/351 |
| 6,920,154 | B1* | 7/2005 | Achler | 370/477 |
| 7,133,396 | B1* | 11/2006 | Schmidl et al. | 370/347 |
| 7,391,736 | B2* | 6/2008 | Na et al. | 370/477 |
| 7,505,764 | B2* | 3/2009 | Proctor et al. | 455/423 |
| 2002/0136169 | A1* | 9/2002 | Struhsaker et al. | 370/280 |
| 2003/0002473 | A1* | 1/2003 | Goodings et al. | 370/349 |
| 2005/0075125 | A1* | 4/2005 | Bada et al. | 455/525 |

OTHER PUBLICATIONS

Bluetooth Spec, 2002.*

Motorola, Partial Chase Combining for code Management, TSGR1-01-0543, May 2001.*

International Search Report for PCT/NL2004/000225, dated Dec. 6, 2004.

International Preliminary Examination Report for PCT/NL2004/000225, dated Jun. 20, 2006.

Rubin et al., "Synchronous and Carrier-Sense Asynchronous Dynamic Group-Random-Access Schemes for Multiple-Access Communications," © 1982 IEEE, pp. 43-50.

"About," IEEE 802.15 Working Group for Wireless Personal Area Networks, © 2001 IEEE, 1 page.

"Frequently Asked Questions," IEEE 802.15 Working Group for Wireless Personal Area Networks (WPANs), last modified May 27, 1999, 4 pages.

* cited by examiner

| | NACK baseband receiver timeline | | |
|---|---|---|---|
| Total Power detector  3 us | Narrow-band interference Training  3 us | Antenna Selection  4 us | NACK Energy Detection  10 us |

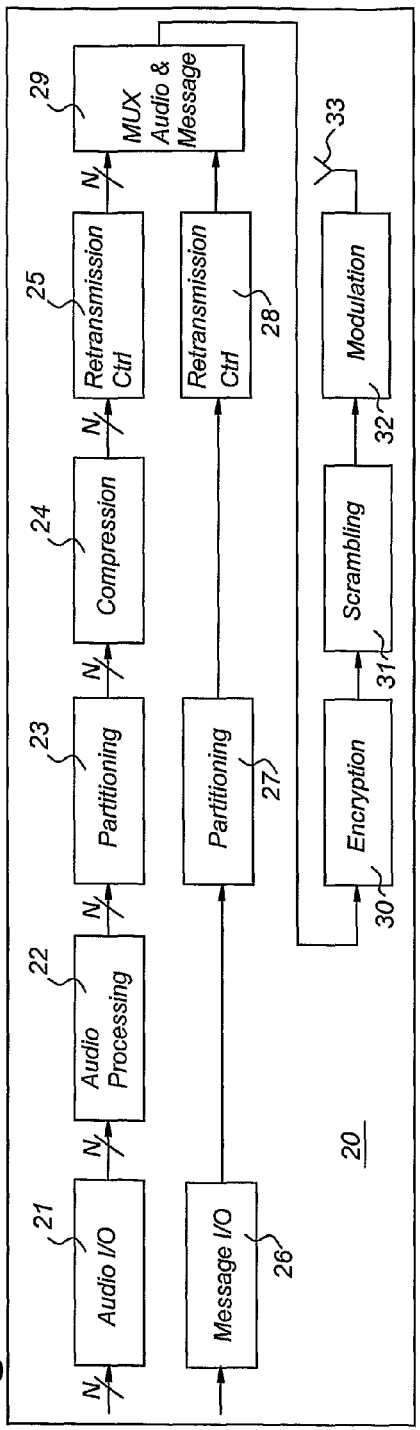
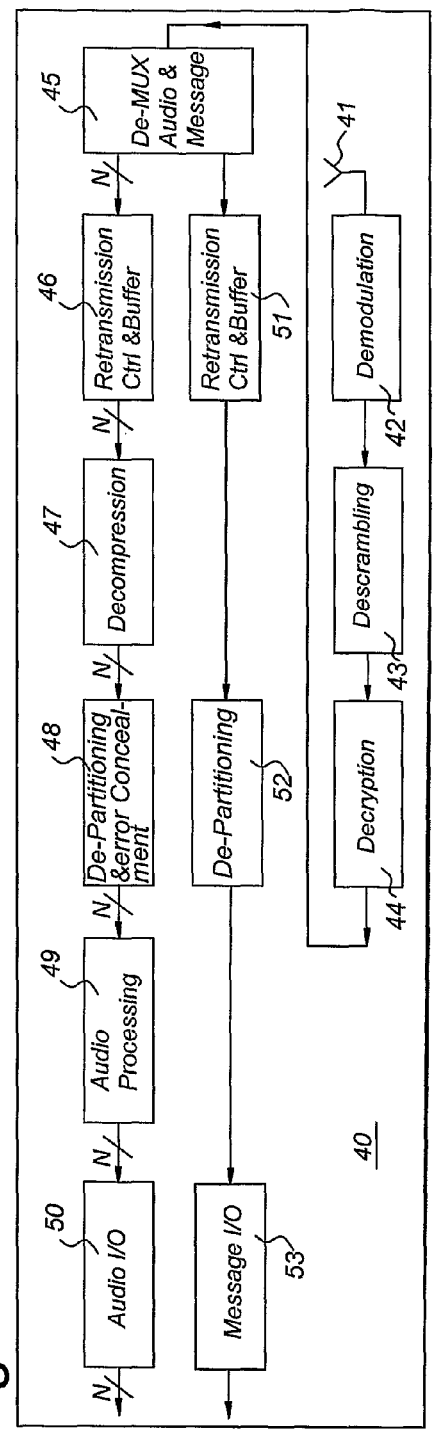
Fig 5
Fig 6

WIRELESS AUDIO TRANSMISSION SYSTEM AND METHOD

CROSS-REFERENCE TO RELATED APPLICATIONS

This application is a 371 of international application number PCT/NL2004/000225, filed on April 5, 2004.

FIELD OF THE INVENTION

The present invention relates to a method for transmitting at least one data stream from a source to at least one destination over a communication channel, the at least one data stream comprising a sequence of a plurality of data packets, the data stream being transmitted over the communication channel using a protocol comprising data frames, in which each data frame has at least one fixed slot.

In a further aspect, the present invention relates to a transmitter arrangement for use in a system for transmitting at least one data stream from a source to at least one destination over a communication channel, the transmitter arrangement comprising input processing means for assembling data packets for each of the at least one data stream, and a multiplexer arranged to receive data packets for each of the at least one data stream and to assemble a data frame to be transmitted over the communication channel, in which each data frame has at least one fixed slot.

In an even further aspect, the present invention relates to a receiver arrangement for receiving at least one data stream transmitted by a transmitter arrangement according to the present invention.

PRIOR ART

A communication system allowing transmission of audio data streams is known from American patent U.S. Pat. No. 6,373,842, describing unidirectional streaming services in wireless systems. In this method, it is possible for a receiver of data packets to request a retransmission of a data packet which was incorrectly received. This method is suitable for the transmission of audio over a given wireless access network. It does however not provide a solution for sharing of the medium by multiple users, or sharing a stream by multiple receivers, where each has specific radio propagation conditions.

The IEEE standards 802.11 as well as 802.15.4 incorporate mechanisms for guaranteeing minimum throughput on specific channels, while simultaneously reserving the channel for shared ('free') access. Without considering bandwidth, this would make them suitable for transmitting audio. However, the principal shortcomings of the abovementioned protocols, for the purpose of transmitting audio, are, firstly, that they are not capable of retransmission control for one data stream with multiple destinations, secondly, that the fixed (reserved or guaranteed) slots have to be allocated before the start of the frame, whereas ad hoc allocation would reduce the probability of exceeding a defined maximum allowed audio latency, and thirdly, that the shared access is not suitable for audio since it is based on contention with CSMA/CD implying a loss of throughput and interference robustness.

SUMMARY OF THE INVENTION

The present invention seeks to provide a streaming data communication system, e.g. suited for streaming audio applications, which can operate in an environment with multiple possible sources of interference, while maintaining a low latency and a high audio quality.

According to the present invention, a method according to the preamble defined above is provided, in which each data frame further comprises at least one freely allocatable slot, in which a specific data packet, which is not properly received by the at least one destination, is retransmitted from the source using one of the at least one freely allocatable slot. This method allows to retransmit a packet which is not properly received due to e.g. interference, thus resulting in a higher chance of a correct and complete data stream arriving at the destination.

In a further embodiment, the specific data packet for a specific data stream is retransmitted in the fixed slot of that specific data stream in a next data frame. Although retransmission in a next data frame will increase the data latency, proper dimensioning of the data frames may keep this in acceptable limits. Allowing a missed data packet to be resent in a next data frame will even make the transmission method more robust, increasing the chance of a complete error free data stream reception.

The data frame may in a further embodiment comprises a down-link part and an up-link part, each having at least one fixed slot and at least one freely allocatable slot. This allows for two-way communication, e.g. including message data (e.g. control data, handshake data, etc.) between the source and the destination.

In an even further embodiment, a data packet has a predefined duration, e.g. 250 μsec for the data packet and the acknowledge space, the predefined duration being small compared to non-transmitting gaps of possible interfering sources. In this embodiment, it is ensured that data packets fit in between packets of other, possibly interfering sources, such as Bluetooth, Wifi, DECT, etc. The non-transmitting gaps may in a further embodiment be detected by carrier sense/detect techniques, and the method further comprises the synchronization of the data stream transmission to the detected non-transmitting gaps.

The method, in a further embodiment, comprises receiving acknowledgement (positive acknowledgment (ACK) or negative acknowledgement (NACK)) of a received data packet from the at least one destination, and retransmitting a not properly received data packet within the same data frame. This will ensure a low latency, when there is only a short delay between reception of a packet and transmission of the acknowledgement. In an exemplary embodiment, each data frame comprises N fixed slots with a single negative acknowledge sub-slot following each of the N fixed slots, and each of the freely allocatable slots comprises N negative acknowledge sub-slots following the freely allocatable slot for indicating in which of the N fixed slots a packet was not received. This is a very effective acknowledgment mechanism, requiring little overhead.

In an even further embodiment, the acknowledgment comprises a pseudo-noise code. This opens up the possibility for using multi-code NACK in a multi-frequency system. It provides a good adjacent channel isolation, also in the case when one destination is close to the source and another destination is further away (near-far problem).

At least one freely allocatable slot may, in a further embodiment, be allocated to transmit a control data message. Control data messages may be sent randomly when necessary, not in a continuous fashion. A freely allocatable slot may allow this, in the case of one or more destinations.

In the case of a multiple access transmission system, a back-off mechanism may be used for transmitting the control data message for multiple access. When a user tries to transmit, but finds that the channel is not free, it waits for a predetermined time period before retrying. This allows to share the transmission capacity with other users.

In a further embodiment antenna and/or frequency diversity is applied to make the transmission method more robust against interference of all kinds. For example, an adaptive frequency selection mechanism may be used to circumvent channels which experience interference. Also, this embodiment provides a better rejection of multi path distortion and/or interference.

To obtain a higher throughput rate in an embodiment of the present method, a data packet is compressed before transmission. As an alternative, a data packet is transmitted uncompressed in the first transmission, and compressed in at least one of the retransmissions.

In a further embodiment, specifically directed at streaming audio applications, the method further comprises converting received data packets in an audio signal, replacing a missing data packet by an earlier received data packet, and smoothing the transition between the earlier received data packet and the replaced data packet. This allows to prevent audible ticks in case of receive errors, increasing the method quality of reception. As an example, the smoothing may be applied using a raised cosine filter function.

To obtain a flat spectrum transmission signal using the present method (e.g. to comply with regulatory standards), the method further comprises scrambling a retransmitted data packet before retransmission using a pseudo-randomly varying scrambling technique, and descrambling the retransmitted data packet upon reception. Furthermore, the method may further comprise integrating multiple retransmitted data packets. As the error distribution varies in time, this allows gain from integration, and a more robust method as a result. Also, the method according to the present method may be protected against eavesdropping by using encryption of the data packets in the data stream.

To mitigate problems related to near-far problems, the method may comprise that the source increases its transmission power upon determination that a data packet is not properly received by the destination. This may include a closed loop power control. Furthermore, in a further embodiment, the source compares the received signal strength to a threshold value, and decreases its transmission power by a predefined step if the threshold value is exceeded, and increases its transmission power by a predefined step otherwise. The threshold value may be adaptively controlled by an outer control loop.

The method, as discussed in the embodiments above, relates to data packets. A data packet comprises a preamble, and/or a header, and/or at least one packet of control message data, and/or at least one packet of application data from at least one input. Multiple input data packets and control message data may be multiplexed into a single stream of data packets.

In a further aspect, the present invention relates to a transmitter arrangement as defined in the preamble above, in which the multiplexer is further arranged to provide at least one freely allocatable slot in each data frame, and in which the transmitter arrangement further comprises retransmission control means connected to the multiplexer and arranged to retransmit a specific data packet, which is not properly received by the at least one destination, using one of the at least one freely allocatable slot. In further embodiments, the multiplexer and/or retransmission control means are further arranged to execute the present method. The transmitter arrangement may further comprise a compressor, a scrambler for scrambling a retransmitted data packet before retransmission using a pseudo-randomly varying scrambling technique, an encryption module for encrypting data packets before transmission, or a modulator.

In an even further aspect, the present invention relates to a receiver arrangement for receiving at least one data stream transmitted by a transmitter arrangement according to the present invention. The receiver arrangement may further comprise audio processing electronics, a descrambler for descrambling a retransmitted data packet upon reception, and/or a pre-detection accumulator for integrating multiple retransmitted data packets.

SHORT DESCRIPTION OF DRAWINGS

The present invention will be discussed in more detail below, using a number of exemplary embodiments, with reference to the attached drawings, in which FIG. 1 shows a simplified diagram of a wireless transmission system in which the present invention may be applied;

FIG. 5 shows a block diagram of a transmitter according to an embodiment of the present invention;

FIG. 6 shows a block diagram of a receiver according to an embodiment of the present invention.

DETAILED DESCRIPTION OF EXEMPLARY EMBODIMENTS

The present invention relates to a wireless digital audio transmission system, and can be applied in a number of streaming data applications, and is specifically suited for audio data streams. Examples of such applications include, but are not limited to, a wireless conference system, a wireless tour guide system, a wireless headphone, wireless speakers, wireless stereo audio with MIDI, wireless earphones, a wireless microphone, a wireless public address system, a wireless intercom, etc.

Figure 1:
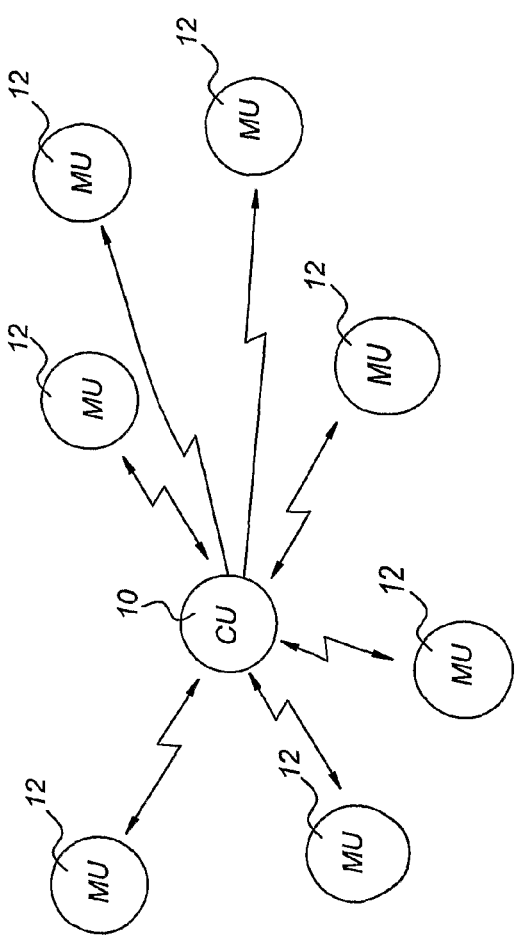

FIG. 1 shows a simplified diagram of an embodiment of the present invention, having a single central unit 10, and a number of mobile units 12. The central unit 10 is arranged to distribute or collect audio data to/from the mobile units 12. The data streams between the central unit 10 and each of the mobile units 12 may be uni-directional (indicated by single arrow) or bidirectional (indicated by double arrow, e.g. including bidirectional audio or message data such as requests). The central unit 10 may transmit a data stream addressed to a single mobile unit 12 (uni-cast), several mobile units 12 (group- or multi-cast) or all mobile units 12 (broadcast).

The data streams between the central unit 10 and mobile units 12 are sent by RF signals (air interface), e.g. in the 2400-2483 MHz ISM band or the 5 GHz UNII/ISM bands. In this embodiment, several data (or audio) streams are transmitted by the central unit 10, using Time Division Duplex (TDD) techniques. Data is sent over the air interface in frames, in which each frame comprises time slots for downlink and time slots for uplink. As will be understood, different embodiments may be envisaged, using e.g. only downstream or upstream channels.

Figure 2:
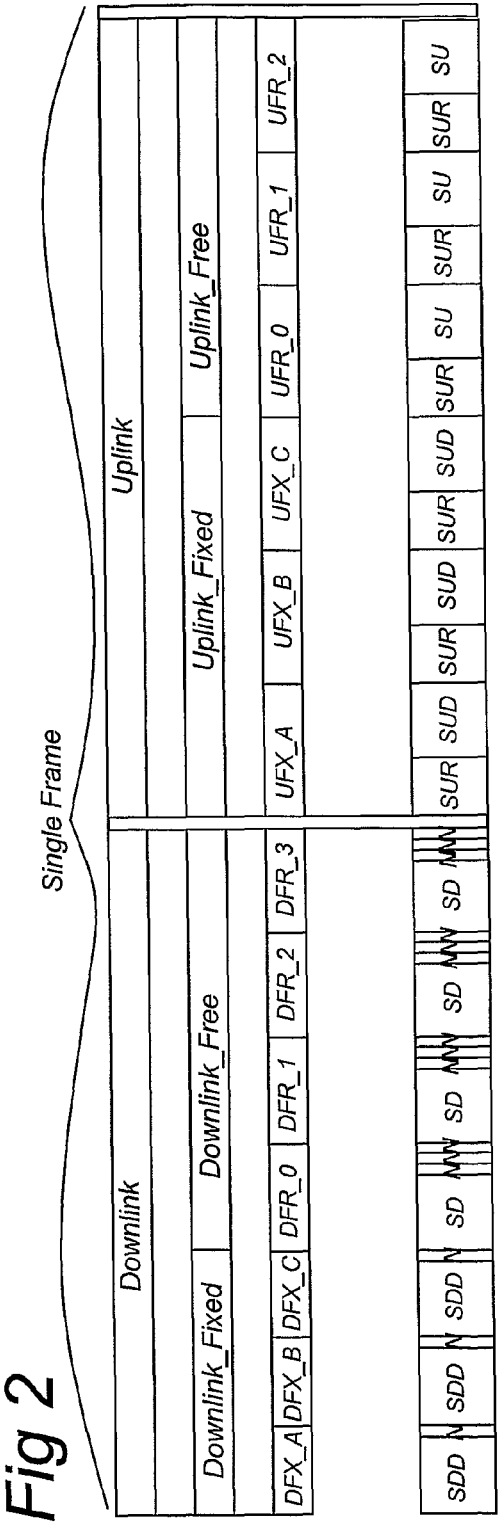
FIG. 2 shows a schematic diagram of the structure of a data frame as used in an embodiment of the present invention.

A single frame, as used in a particular embodiment, comprising three downlink audio data streams, and three uplink audio data streams, is depicted in FIG. 2. The downlink data is organized as broadcast or multi-cast transmissions, and the uplink data is organized as uni-cast transmissions (always directed to central unit 10). The single frame is e.g. 2 ms long, and comprises a downlink part of 1 ms and an uplink part of 1 ms. If the audio sources are 16 bit PCM coded audio at 24 ksps, and if the air interface speed is 11 Mbps, this results in a latency of less than 15 ms, while exhibiting excellent interference robustness. For each data stream (or channel), the frame comprises a single fixed time slot (DFX_A ... DFX_C) in the downlink part and a single fixed time slot (UFX_A ... UFX_C) in the uplink part. Furthermore, the downlink part comprises four free time slots (DFR_0 ... DFR_3) and the uplink part three free time slots (UFR_0 ... UFR_2).

In the lower part of FIG. 2, the actual data packets are shown. In the downlink part, in the fixed time slots, a stream down with data (SDD) packet is followed by a single negative acknowledge (NACK) space. The NACK packet is sent by the receiving mobile unit 12 in that space whenever an expected data stream packet is not received. Using negative acknowledge packets has certain advantages which will be explained below. In the free slots DFR_0 ... DFR_3, the downlink data stream packet (SD), which may or may not comprise a resent data packet, is followed by three NACK spaces, as any of the three data streams may require a NACK packet from any one of the receiving mobile units 12.

In a generally analogue manner, the uplink channels comprise a stream up request (SUR) from one of the mobile units 12 to the central unit 10, followed by a stream up data packet (SUD). In the free uplink time slots, a stream up request (SUR) is possibly followed by a stream up (SU) packet.

As the frame comprises a combination of fixed allocated time slots and flexibly allocatable time slots, a minimum throughput on a specific audio data stream is guaranteed, while also bandwidth is available which may be used for the audio data streams that need retransmission. This has particular advantages for a continuous data source, such as audio, where every air-frame a new data packet is generated. Since the free slots are shared between multiple streams, a stream with a bad RF link will claim most of the free slots, thereby reducing the retransmission capacity for other streams. The fixed slot therefore guarantees a stream with a good RF link to remain unaffected.

A data stream which experiences loss of a data packet (e.g. in time slot DFX_A) will, according to the present invention, retransmit that packet in one of the freely allocatable time slots DFR_0 ... DFR_3. Thus for each stream, only one time slot per frame can be fixed, although there may be more than one retransmission of that data packet in the same frame. E.g., when a retransmission in time DFR_0 fails, there may be a further attempt in any of the remaining free time slots DFR_1 ... DFR_3. If, for a particular stream, the retransmission fails repetitively, so that a data packet is not successfully transmitted in the free slots, the fixed slot belonging to this stream and the subsequent free slots of the next frame can be used to retry sending the data packet. This process is be repeated a predefined number of frames, until the data packet is considered lost.

The fact that data streams are time division duplexed with fixed and free slots enables low power consumption, in particular when the reception quality is good. The reason is that a high reception quality results in the first transmission attempt of a particular data packet to be successful. In this case, the fixed slot suffices for transmission of the complete audio data stream. Therefore, the receiving device may be powered-down in between fixed slots of the considered data stream.

In a further embodiment, shared access data transmission is possible in the present communication system. One or more uplink time slots UFR_0 ... UFR_2 may be dedicated for shared access, and in these time slots, the central unit 10 actively indicates whether the shared channel is free or occupied, e.g. using a flag in a request packet SUR. This allows for mobile units 12, that are not dedicated to provide an uplink stream, to still send message data to the CU 10. The mobile unit 12 responds by accessing that particular channel with new message data, but only when the channel is indicated as being free. When a first packet of the message is successfully received by the central unit 10, the flag is set to occupied until the end of the data message reception by the central unit 10. When a mobile unit 12 tries to access the shared channel, but is unsuccessful, a back-off time is introduced before a further attempt is made by the mobile unit 12 to access the data channel again. By using a random back-off time, contention by multiple mobile units 12 to access the shared channel may be mitigated.

The frame length, and more specifically the time slot/packet length, is very short to enable successful transmission of a data packet in the presence of intermittent interfering sources, such as Bluetooth packets, DECT-on-2.4 GHz, wireless LAN transmissions or other non-continuous transmission sources. In a particular embodiment, the packet length has a maximum of 250 μs. Such a short packet length imposes strict requirements, such as a short preamble, short header (an efficient protocol for medium access control), and a high air interface bit rate.

In the embodiment shown, the central unit 10 dictates the transmission protocol in order to prevent packet collisions from the mobile units 12. The central unit 10 may also include a detection method for detecting interference sources and adjust the timing of its own transmissions to fit between these interference sources. Such a detection method may be implemented using a carrier sense or carrier detect system.

In order to provide a robust communication system with a low latency and a high audio quality, the present system will resend a data packet which is not properly received in a free time slot (DFR_0 ... DFR_3; UFR_0 ... UFR_2) in the same data frame. This ensures a very low latency in the data packet stream.

The detection whether a data packet is properly received may be done in one of several manners, known as such in the art, such as parity error detection schemes, cyclic redundancy checksum (CRC) test, etc. As the system may be used for bi-directional communications, in the following, the terms transmitter and receiver will be used, which may be either one of the central unit 10 or one of the mobile units 12, depending on the transmission direction.

To maximize the possibility that a missed audio and/or message data packet can be resent in the same frame, the receiving unit is arranged to send a (negative) acknowledgment for receiving a packet almost immediately after reception. In a specific embodiment, an acknowledgment (ACK) must e.g. be received by the transmitting unit within about 80 to 200 μs, and a negative acknowledgment (NACK) must be sent by the receiver within 25 to 60 μs. This feature allows the system to benefit from gaps in interference sources. Due to the short packet duration and the almost immediate ACK/NACK response, there is a high correlation between the events that a stream packet is not interfered with and that the ACK/NACK response is not interfered, which increases the retransmission efficiency of the present protocol.

The present invention may use any of the automatic retransmission protocols (ARQ) which either use a positive acknowledgment (ACK) or a negative acknowledgement (NACK). In a particular embodiment, the receiver only determines whether RF energy with a specific pseudo-noise signature is present in the associated NACK slot (see FIG. 2). This is particularly advantageous in multi-cast or broadcast transmissions, where multiple mobile units 12 may send a NACK response when not properly receiving a data packet. Although the (multiple) NACK responses may interfere with each other, this is not a problem when only detecting the presence of RF energy.

By using only a single NACK response window in the frame for each of the audio data streams A . . . C, the protocol is very efficient. For reliable NACK detection, the fixed slot NACK response window requires a duration of about 20 µs.

In the case of a retransmission in one of the free time slots DFR_0 . . . DFR_3, it must be made clear to the (re)transmitting unit 10, 12 which audio data stream A . . . C has been incorrectly received. This may be implemented in the manner depicted in FIG. 2, where each of the free time slots DFR_0 . . . .DFR_3 is followed by three NACK windows, each associated with one of the fixed audio data streams A . . . . C. When a receiver incorrectly receives an audio data packet for stream A, it will send a NACK response in the window associated with stream A. The transmitter can thus check whether a received NACK response is actually correct by checking the timing.

The present invention may also be applied in multiple frequency transmission systems, where each frequency carries a protocol as described in the above embodiments. In this case, the frame timing of the different frequency signals needs to be synchronized, in order to prevent co-located central units 10 and mobile units 12 at adjacent frequencies from interfering each other. Still, mobile units 12 that are near to the central unit 10, may cause interference to mobile units 12 in an adjacent frequency channel with a weak link. This is frequently referred to as the near-far effect. This effect will pose a problem to reception of uplink data streams, as well as NACKs. As a solution, the mobile unit 12 may apply transmit power control.

Apart from power control, the near-far problem for the NACK responses may be further mitigated by coding NACK responses at different frequencies with mutually (semi-) orthogonal codes, each frequency having a unique code. Examples of these kind of codes are:

pn05=[1 1 1 1 0]
pn07=[1 1 1 0 1 0 0]
pn11=[1 0 1 1 0 1 1 1 0 0 0]
pn15=[0 0 0 0 1 0 1 0 0 1 1 0 1 1 1]
pn19=[0 0 0 0 1 0 1 0 1 1 1 1 0 0 1 0 0 1 1]

In the case that the interference from adjacent channels experienced is due to receive chain non-linearity, the high degree of orthogonality may be lost. The different repetition times of the codes given above may then be exploited to achieve sufficient adjacent channel isolation.

The detection of NACK responses in the transmitter is advantageously designed for a short NACK length, while still maintaining a high detection probability, high interference robustness and low false alarm rate. A missed NACK response will result in no retransmission of the associated data packet, and thus a missing data packet in the audio data stream. When the NACK detector operates based on received RF energy, the detection period needs to be sufficiently long to be able to collect a significant amount of energy. According to a specific embodiment of the NACK detector, NACK responses of only 20 µs suffice for detection.

Figures 3, 4:
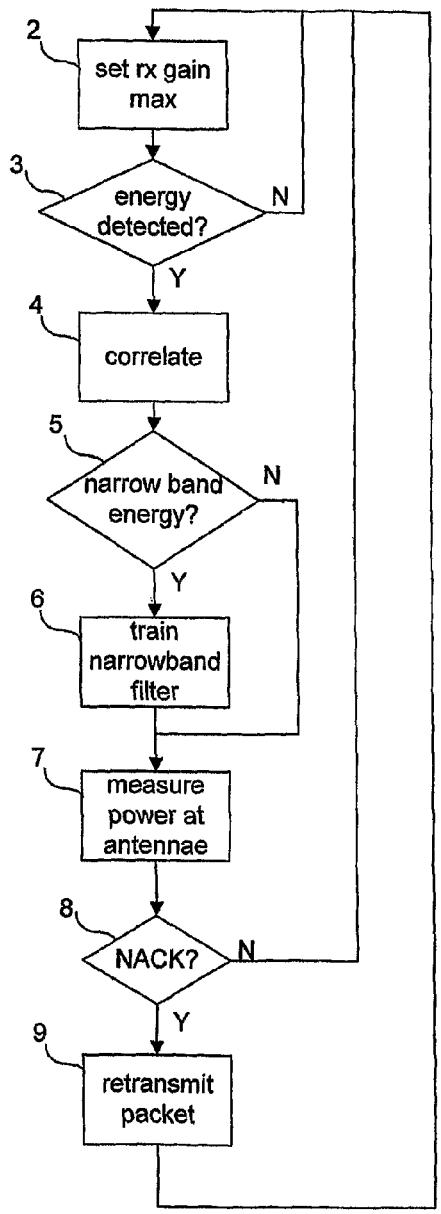
FIG. 3 shows a flow chart illustrating an embodiment of the method according to the present invention.
FIG. 4 shows an exemplary timeline of an implementation of an acknowledge mechanism in an embodiment of the present invention.

In FIG. 3, a flow chart is shown, in which the flow according to this specific embodiment of the present invention is given. In block 2, the NACK receiver is put in its highest gain level, so that even weak signals are received well above the noise level. While this means that the signal may become clipped, it does save the time required for the automatic gain control loop to settle.

The signal energy level is detected, and in decision block 3, it is decided whether or not the signal has sufficient power to possibly be a NACK response. If not, the flow returns back to block 2 for the next NACK time slot detection. If yes, the correlation between samples is measured with a time distance equivalent with the symbol rate. This allows the receiver to discern between energy from a narrow-band interferer and the wide-band NACK response (block 4). If there is sufficient narrowband signal energy present (decision block 5), this signal may be filtered out by using a notch filter. The notch is put at a frequency of the narrowband interferer, which, in one particular embodiment, may be calculated form the phase of the complex correlation signal (block 6). If no narrowband interference is detected, the flow continues directly with block 7, which applies the antenna diversity selection by measuring the energy level at each of the available antennae, and selects the antenna with the highest energy level. In block 8, it is checked whether a NACK response is actually present, e.g. by correlating the received signal (a pseudo noise sequence signal) with a delayed version (delay equal to the PN code repetition time), and comparing the correlation power with a preset threshold. If a NACK response is detected, the transmitter is signaled to resend the associated data packet (block 9), otherwise the flow returns to block 2.

In FIG. 4, a NACK detector time line of in total 20 µs is illustrated for the above example. In a first time period, e.g. 3 µs, the total received power is detected, followed by detection and training of narrowband interference (also 3 µs). The antenna diversity selection may take another 4 µs, which leaves a time window of 10 µs for the actual NACK response detection. It is noted that this type of NACK response detection, as illustrated in FIGS. 3 and 4, may also be applied in other ARQ protocol implementations.

In all described embodiments, antenna diversity may be used to make the communication system more robust against fading. Antenna diversity techniques may be employed using successive quality measurements on every preamble of a data packet received, by switching to the antenna having the best quality index. Alternatively, only a single measurement may be made on an a priori selected antenna, and switching to the other antenna may be executed only when the measured quality parameter falls below a predefined threshold.

In FIG. 5, a schematic block diagram is shown of a wireless audio transmitter arrangement 20 according to an embodiment of the present invention. The transmitter 20 may receive message data (message input 26, e.g. I2C interface) and one or more audio data streams (audio data input 21). The audio data input and output may be any type of digital format, such as linear PCM, ADPCM, MPEG layer 3 or AC3 compressed audio, which are known in the art. The audio data may be carried over standard digital audio interfaces, such as S/PDIF, I2S, or IEC61937, which are known in the art. Each audio source data stream is audio processed (block 22), eg. for sample rate adaptation, and partitioned in audio data packets (block 23), after which a compression of the audio data packet may be applied (block 24). Both the audio data packets and message data packets are put in a buffer before the data frame (see FIG. 2) is assembled. Part of this process is the retransmission control of any of the (audio) data packets, as described above (retransmission control blocks 25, 28). The audio and message packets are multiplexed into a single stream packet in multiplex block 29. Then, the data packet may optionally be submitted to encryption (block 30) and/or scrambling (block 31), and finally modulation on a carrier frequency (block 32) before being fed to an antenna 33.

FIG. 6 shows a schematic block diagram of an exemplary embodiment of a wireless audio receiver 40 according to the present invention. In the receiver arrangement 40, the various processing blocks of the transmitter are repeated in an reverse manner: after reception of the air interface signal using antenna 41, the signal is demodulated (block 42), descrambled (when necessary, block 43), and decrypted (when necessary, block 44). The resulting data packet is then de-multiplexed in different audio data packets and message data packets (demux block 45). The retransmission control and buffer blocks 46, 51 (audio and message, respectively) check whether each data packet is received without error, and signals when a retransmission is necessary (which is then taken care of by the transmitter arrangement 20 in the same unit 10, 12). For the audio data streams, the packets are then decompressed (block 47), further processed (block 48, de-partitioning and error concealment). After that, the audio data streams are audio processed in block 49, eg. for volume regulation and sample rate adaptation, and fed to the audio I/O (block 50). Message data packets are only de-partitioned (block 52) and then fed to the message I/O (block 53).

The implementation of the retransmission protocol as described in the above embodiments, may be supplemented with other techniques, which are known per se in the art. E.g., decision feedback equalization (DFE) and a fractionally spaced equalizer (FSE) may be used to equalize a multi-path faded signal and to provide additional narrowband interference cancellation. Also, antenna diversity schemes and dynamic frequency (re-)allocation protocols may be added to the present communication system. Also, error concealment may be applied to further improve the robustness and efficiency of the communication system. In total, a very robust communication system against interference and fading may be achieved, without requiring channel coding/decoding techniques, interleaving/de-interleaving techniques, or frequency hopping techniques. Known systems use forward error correction (FEC) schemes, with or without interleaving. Together with block interleaving against burst errors, (from interference and fading), a significant gain can be achieved in bit error rate and frame error rate. However, this comes with a number of disadvantages, such as required buffering capacity, latency increase, and processing and memory requirements.

In the following, some of the blocks depicted in FIGS. 5 and 6 will be explained in more detail. It is noted that these implementations of specific parts of the transmission system may be applied as such, i.e. in other applications than the automatic retransmission protocol implementation described above.

In order to increase the capacity of the system, compression and decompression of data packets (blocks 24,47) may be used. In a particular embodiment of the present invention, the first transmission of an audio data packet is not compressed. Upon failed (or repetitively failed) reception of this packet the destination requests retransmission. The source may then retransmit this packet with compression.

The error concealment technique (block 48 in FIG. 6) may be implemented using the following particulars. A (repeatedly) failed retransmission will eventually result in audible deformation of the received audio signal. Using the error concealment technique as described, applying a windowing function, it is possible to fade in and fade out the audio signal of a recently received audio block. This way, the resulting audio signal at the receiver end will not be distorted in an unpleasant manner.

In the present audio transmission system, an air frame failure may occur, and an audio block failure. A failed air frame will be retransmitted using the present invention, until a certain number of retries is reached, after which the air frame will be marked as lost. The audio blocks that depend on this particular air frame are then marked as lost as well. A delayed audio block, which is still present in a digital memory of the receiver unit, will replace the lost audio block. By applying a smooth transition window between the current and delayed audio blocks, it is possible to prevent ticks in the eventual audio signal. When more than one audio block is lost, the received audio signal will fade out to a zero signal (absolute silence).

Figure 7:
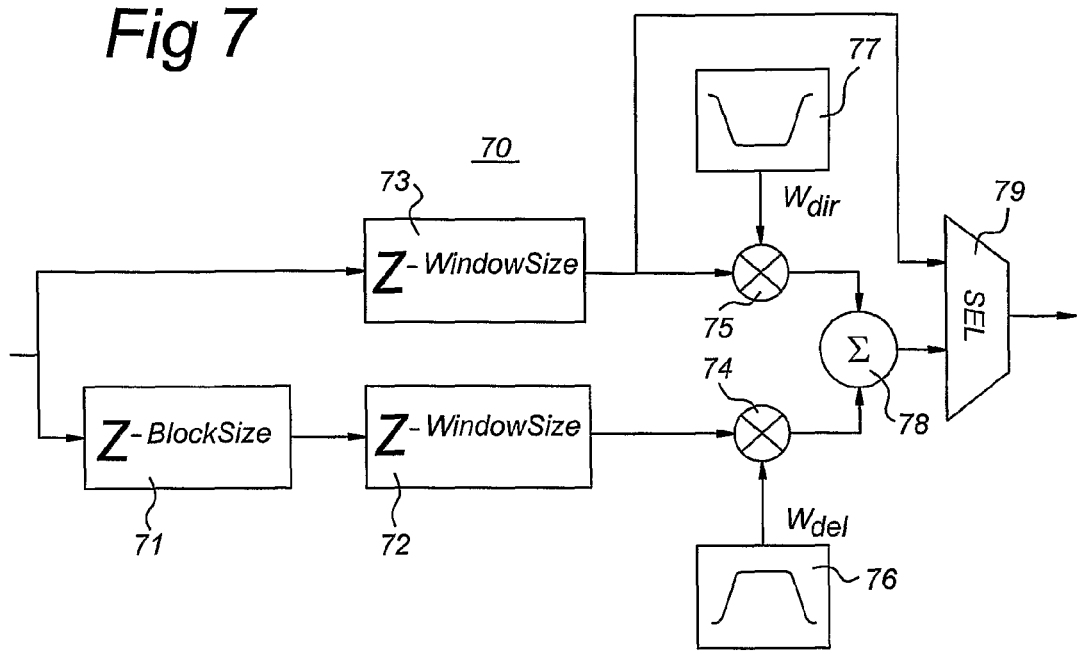
FIG. 7 shows a simplified block diagram of an embodiment of an error concealment module of a receiver according to the present invention.

In FIG. 7, a hardware implementation module 70 of the error concealment technique is shown. The input data, comprising audio blocks, is divided in two branches. In the normal situation, the audio block is only delayed with the window size (block 73) to allow synchronization with the window multiplier to be discussed later. The selection unit 79 will pass the (delayed) audio block to the output when no lost audio block is detected. Whenever a lost audio block is present, the selection unit 79 will pass the summation of the two branches of FIG. 8 (adder element 78). The upper branch represents the current audio block, which is multiplied by a negative window function 77 in multiplier 75. The lower branch first comprises a delay element 71, which delays the audio block with exactly an audio block period, and a window delay element 72. After that the (previous) audio block is multiplied by a window function 76 and passed to the adder element 78. The window functions 76, 77 may e.g. be cosine functions.

The transmitter arrangement 20 (FIG. 5) may comprise an optional scrambling unit 31, and the receiver arrangement 40 (FIG. 6) may comprise a corresponding de-scrambling unit 43. The scrambling unit 31 pseudo-randomly may change the data differently each (re-)transmission, and the de-scrambling unit 43 de-scrambles the data signal correspondingly. The de-scrambling unit 43 may further comprise a soft-valued pre-detection accumulator. The rationale behind this is that retransmitted data packets consist of the same data. If these retransmissions occur within the coherence time of the radio channel, the bit error distribution in the packet will not vary significantly between retransmissions. By scrambling each retransmission in a different way, the bit error distribution is randomized, allowing for sensitivity gain by means of pre-detection integration. The detection procedure is then as follows: A received packet is checked for errors, e.g. with a CRC check. If the packet is in error, the descrambled soft data originating from the demodulator, is added, in the pre-detection integrator, to previously received packets with the same packet ID. This packet ID is identical for (re)transmissions of the same packet. The data in the soft value integrator is detected, and the resulting packet is checked for errors. If the packet is error-free, the transmission is considered successful, and no retransmission is requested. Also, the scrambling will result in a flat power density, which may be important for compliance with regulatory standards.

The present communication system may comprise multiple central units 10, which then are usually co-located. Mobile units 12 will be scattered throughout the coverage area, resulting in near-far problems with respect to signal power, but mainly in the up-link part of the signal only. In known power control methods, a fast inner loop is used and a slowly reacting outer loop. The inner loop takes into account a signal characteristic, such as signal-to-noise ratio (SNR), received signal strength indicator (RSSI) or bit-error-rate (BER), in a single slot, and compares this characteristic to a target level (or threshold value). Depending on the result of the comparison, the transmission power is amended, usually using small up or down steps. The target level is set by the outer loop, e.g. based on average checksum or BER measurements.

In the present communication system, the transmitter immediately increases the transmitting power when receiving a (negative) acknowledge packet indicating a data packet has been received with error. When a packet is received correctly, the RSSI is compared to a target level, and depending on the comparison, the transmitter power level is either stepped up or down. This target level may e.g. be determined in an outer loop, as mentioned above, or may be a default value.

Although the above embodiment has been explained using RF communications in the ISM band, it is of course possible to implement the invention in other RF frequency bands, or even using other wireless techniques, such as infrared. The examples of the invention as described above relate to a time division multiplexing (TDM) scheme, in which a data frame is divided in an number of time slots. However, the present application may also be implemented in multiplexing schemes of other types, such as, but not limited to frequency division multiplexing, code division multiplexing, etc.

The invention claimed is:

1. A method for transmitting at least one data stream from a source to at least one destination over a communication channel, wherein the at least one data stream comprises a sequence of a plurality of data packets, and wherein the method comprises:
    transmitting the at least one data stream over the communication channel using a signal comprising data frames according to a protocol, wherein each data frame comprises N fixed slots with a single negative acknowledge sub-slot following each of the N fixed slots, and at least one freely allocatable slot, wherein each freely allocatable slot comprises N negative acknowledge sub-slots following the freely allocatable slot for indicating in which of the N fixed slots a specific data packet was not received; and
    retransmitting a specific data packet, which is not properly received by the at least one destination, from the source using one of the at least one freely allocatable slot, wherein the specific data packet is transmitted uncompressed in the step of transmitting, and compressed in the step of retransmitting.

2. The method according to claim 1, where the step of retransmitting comprises retransmitting the specific data packet for a specific data stream in the fixed slot of that specific data stream in a next data frame.

3. The method according to claim 1, wherein each data frame comprises a down-link part and an up-link part, each having at least one fixed slot and at least one freely allocatable slot.

4. The method according to claim 1, wherein a data packet has a predefined duration, the predefined duration being small compared to non-transmitting gaps of possible interfering sources.

5. The method according to claim 4, further comprising detecting the non-transmitting gaps by carrier sense/detect techniques, and synchronizing the data stream transmission to the detected non-transmitting gaps.

6. The method according to claim 1, further comprising receiving acknowledgement of a received data packet from the at least one destination, and retransmitting a not properly received data packet within the same data frame.

7. The method according to claim 6, wherein the acknowledgment comprises a pseudo-noise code.

8. The method according to claim 1, further comprising allocating at least one freely allocatable slot to transmit a control data message.

9. The method according to claim 8, further comprising using a back-off mechanism for transmitting the control data message for multiple access.

10. The method according to claim 1, further comprising applying antenna and/or frequency diversity.

11. The method according to claim 1, further comprising:
    converting received data packets into an audio signal;
    replacing a missing data packet with an earlier received data packet; and
    smoothing a transition between the earlier received data packet and the replaced data packet.

12. The method according to claim 11, wherein the step of smoothing comprises using a raised cosine filter function to smooth the transition between the earlier received data packet and the replaced data packet.

13. The method according to claim 1, further comprising scrambling a retransmitted data packet before retransmission using a pseudo-randomly varying scrambling technique, and descrambling the retransmitted data packet upon reception.

14. The method according to claim 13, further comprising integrating multiple retransmitted data packets.

15. The method according to claim 1, further comprising the source increasing its transmission power upon determination that a data packet is not properly received by the destination.

16. The method according to claim 1, further comprising the source comparing a received signal strength to a threshold value, and either: (a) decreasing its transmission power by a predefined step if the threshold value is exceeded, or (b) increasing its transmission power by a predefined step otherwise.

17. The method according to claim 16, wherein the threshold value is adaptively controlled by an outer control loop.

18. The method according to claim 1, wherein a data packet comprises one or more of a preamble, a header, at least one packet of control message data, and at least one packet of application data from at least one input.

19. A transmitter arrangement for use in a system for transmitting at least one data stream from a source to at least one destination over a communication channel, the transmitter arrangement comprising:
    input processing means for assembling data packets for each of the at least one data stream
    a multiplexer arranged to receive data packets from the input processing means for each of the at least one data stream, wherein the multiplexer is configured to assemble a plurality of data frames to be transmitted over the communication channel, wherein each data frame comprises N fixed slots with a single negative acknowledge sub-slot following each of the N fixed slots, and at least one freely allocatable slot wherein each freely allocatable slot comprises N negative acknowledge sub-slots following the freely allocatable slot for indicating in which of the N fixed slots a specific data packet was not received;
    retransmission control means connected to the multiplexer and configured to retransmit a specific data packet, which is not properly received by the at least one destination, using one of the at least one freely allocatable slot; and a compressor connected to the retransmission control means to enable the specific data packet to be transmitted uncompressed in a first transmission, and compressed in at least one of the retransmissions.

20. The transmitter arrangement according to claim 19, wherein at least one of the multiplexer and the retransmission control means are further configured to execute a method in which the specific data packet for a specific data stream is retransmitted in the fixed slot of that specific data stream in a next data frame.

21. The transmitter arrangement according to claim 19, further comprising a scrambler for scrambling a retransmitted data packet before retransmission using a pseudo-randomly varying scrambling technique.

22. The transmitter arrangement according to claim 19, further comprising a modulator.

23. A receiver arrangement for receiving at least one data stream transmitted by the transmitter arrangement according to claim 19.

24. The receiver arrangement according to claim 23, comprising audio processing electronics.

25. The receiver arrangement according to claim 23, further comprising a descrambler for descrambling a retransmitted data packet upon reception.

26. The receiver arrangement according to claim 25, further comprising a pre-detection accumulator for integrating multiple retransmitted data packets.

* * * * *